United States Patent
Bedekar et al.

(10) Patent No.: US 8,195,807 B2
(45) Date of Patent: Jun. 5, 2012

(54) SYSTEM AND METHOD FOR PROVIDING A DISTRIBUTED VIRTUAL MOBILITY AGENT

(75) Inventors: Anand S. Bedekar, Arlington Heights, IL (US); Rajeev Agrawal, Northbrook, IL (US); Venkat Gopikanth, Buffalo Grove, IL (US); Suresh Kalyanasundaram, Bangalore (IN); Vishnu Ram Ov, Trivandrum (IN)

(73) Assignee: Motorola Mobility, Inc., Libertyville, IL (US)

( * ) Notice: Subject to any disclaimer, the term of this patent is extended or adjusted under 35 U.S.C. 154(b) by 1084 days.

(21) Appl. No.: 11/913,937

(22) PCT Filed: Jun. 19, 2006

(86) PCT No.: PCT/US2006/023729
§ 371 (c)(1),
(2), (4) Date: Nov. 9, 2007

(87) PCT Pub. No.: WO2007/001951
PCT Pub. Date: Jan. 4, 2007

(65) Prior Publication Data
US 2008/0192663 A1    Aug. 14, 2008

(30) Foreign Application Priority Data
Jun. 21, 2005 (IN) ........................... 534/2005

(51) Int. Cl.
G06F 15/16 (2006.01)
H04W 36/00 (2009.01)
H04W 4/00 (2009.01)

(52) U.S. Cl. ................ 709/227; 370/331; 455/436

(58) Field of Classification Search .......... 709/208–211, 709/223–230; 455/41.2, 436–444; 370/331–334
See application file for complete search history.

(56) References Cited

U.S. PATENT DOCUMENTS

| | | | |
|---|---|---|---|
| 5,506,838 | A | 4/1996 | Flanagan |
| 6,195,555 | B1 | 2/2001 | Dent |
| 6,230,012 | B1 | 5/2001 | Willkie et al. |
| 6,285,880 | B1 | 9/2001 | Gagnon et al. |
| 6,430,698 | B1 | 8/2002 | Khalil et al. |
| 6,473,413 | B1 | 10/2002 | Chiou et al. |
| 6,567,664 | B1 * | 5/2003 | Bergenwall et al. ....... 455/435.1 |
| 6,711,408 | B1 | 3/2004 | Raith |

(Continued)

FOREIGN PATENT DOCUMENTS

EP        0777396 A1    6/1997

(Continued)

OTHER PUBLICATIONS

C. Perkins, IP Mobility, RFC 2002, Oct. 1996.*

(Continued)

*Primary Examiner* — Brendan Higa
(74) *Attorney, Agent, or Firm* — Steven A. May

(57) ABSTRACT

An indication is received from the mobile station (114) indicating that the mobile station (114) is moving from an originating mobility agent (106) to a destination mobility agent (108). An identity of the destination mobility agent (108) is determined using the indication. Routing information is sent from the originating mobility agent (106) to the destination mobility agent (108) using the identity. Incoming data is routed to the mobile station (114) using the routing information.

13 Claims, 2 Drawing Sheets

U.S. PATENT DOCUMENTS

| | | | |
|---|---|---|---|
| 6,721,565 B1 | 4/2004 | Ejzak et al. | |
| 6,795,857 B1 | 9/2004 | Leung et al. | |
| 6,795,891 B2 | 9/2004 | Lin | |
| 6,859,653 B1 | 2/2005 | Ayoub et al. | |
| 6,977,938 B2 | 12/2005 | Alriksson et al. | |
| 7,016,682 B2 | 3/2006 | Won et al. | |
| 7,096,273 B1 | 8/2006 | Meier | |
| 7,139,833 B2 | 11/2006 | Heller | |
| 7,289,463 B2 | 10/2007 | Ozugur | |
| 7,336,670 B1 | 2/2008 | Calhoun et al. | |
| 7,349,380 B2 | 3/2008 | Barker, Jr. et al. | |
| 7,450,544 B2 | 11/2008 | Rue | |
| 7,512,687 B2 * | 3/2009 | Jung | 709/227 |
| 7,649,866 B2 | 1/2010 | Chari et al. | |
| 7,733,829 B2 | 6/2010 | Lee et al. | |
| 7,860,067 B2 * | 12/2010 | Na et al. | 370/338 |
| 2001/0024443 A1 | 9/2001 | Alriksson et al. | |
| 2002/0015396 A1 | 2/2002 | Jung | |
| 2002/0034166 A1 | 3/2002 | Barany et al. | |
| 2002/0057657 A1 | 5/2002 | LaPorta et al. | |
| 2002/0075844 A1 | 6/2002 | Hagen | |
| 2002/0094813 A1 | 7/2002 | Koshimizu et al. | |
| 2003/0016655 A1 | 1/2003 | Gwon | |
| 2003/0018810 A1 | 1/2003 | Karagiannis et al. | |
| 2003/0076837 A1 | 4/2003 | Whitehill et al. | |
| 2003/0104813 A1 | 6/2003 | Julka et al. | |
| 2003/0148777 A1 | 8/2003 | Watanabe et al. | |
| 2003/0174709 A1 | 9/2003 | Shankar | |
| 2003/0202505 A1 | 10/2003 | Ozugur | |
| 2003/0235176 A1 | 12/2003 | Zhang et al. | |
| 2004/0005884 A1 | 1/2004 | Nieminen et al. | |
| 2004/0022212 A1 | 2/2004 | Chowdhury et al. | |
| 2004/0023653 A1 | 2/2004 | O'Neill | |
| 2004/0034705 A1 | 2/2004 | Focsaneanu | |
| 2004/0043791 A1 | 3/2004 | Reddy | |
| 2004/0063455 A1 | 4/2004 | Eran et al. | |
| 2004/0066760 A1 * | 4/2004 | Thubert et al. | 370/329 |
| 2004/0071109 A1 | 4/2004 | Herle et al. | |
| 2004/0082330 A1 * | 4/2004 | Marin | 455/438 |
| 2004/0114559 A1 | 6/2004 | Wang | |
| 2004/0133684 A1 | 7/2004 | Chan et al. | |
| 2004/0185852 A1 | 9/2004 | Son et al. | |
| 2004/0213181 A1 | 10/2004 | Grech et al. | |
| 2004/0213260 A1 | 10/2004 | Leung et al. | |
| 2004/0242233 A1 | 12/2004 | Lutgen | |
| 2005/0047399 A1 | 3/2005 | Lee et al. | |
| 2005/0088994 A1 | 4/2005 | Maenpaa et al. | |
| 2005/0113091 A1 | 5/2005 | Rodriguez et al. | |
| 2005/0122946 A1 | 6/2005 | Won | |
| 2005/0128975 A1 * | 6/2005 | Kobayashi et al. | 370/328 |
| 2005/0135422 A1 | 6/2005 | Yeh | |
| 2005/0148368 A1 | 7/2005 | Scheinert et al. | |
| 2005/0163080 A1 | 7/2005 | Suh et al. | |
| 2005/0180372 A1 | 8/2005 | Cho et al. | |
| 2005/0185632 A1 | 8/2005 | Draves, Jr. et al. | |
| 2005/0213546 A1 | 9/2005 | Reitter et al. | |
| 2006/0104247 A1 | 5/2006 | Dommety et al. | |
| 2006/0112183 A1 | 5/2006 | Corson et al. | |
| 2006/0142034 A1 | 6/2006 | Wentink et al. | |

FOREIGN PATENT DOCUMENTS

| | | |
|---|---|---|
| EP | 1404143 A2 | 3/2004 |
| EP | 1263182 B1 | 12/2008 |
| WO | 0045560 | 8/2000 |
| WO | 03049377 A1 | 6/2003 |
| WO | 2004073324 A2 | 8/2004 |
| WO | 2004073325 A2 | 8/2004 |

OTHER PUBLICATIONS

Wikipedia Article from Internet: "Global System for Mobile Communications", Apr. 17, 2005, http://web.archive.org/web/20050417021658/http://de.wikipedia.org/wiki/Global_System_for_Mobile_Communications, Mar. 27, 2008, pp. 1-13.

Chuan, M.C. et al.: Mobile Virtual Private Dial-up Services:, Bell Labs Technical Journal; Bell Laboratories; U.S., vol. 4, No. 3, Jul. 1999, pp. 51-72.

Perkins, Charles et al.: "IMHP: A Mobile Host Protocol for the Internet", in Proceedings of INET'94/JENC5, (1994), all pages.

Wu, Chun-Hsin et al.: "Bi-direction Route Optimization in Mobile IP over Wireless LAN", Vehicular Technology Conference, 2002, Proceedings. VTC 2002—Fall, 2002 IEEE 56th, all pages.

Perkins, C.: "IP Mobility Support for IPv4", Network Working Group, Request for Comments: 3344, Nokia Research Center, Aug. 2002, all pages.

R. Caceres and V.N. Padmanbhan: "Fast and Scalable Wireless Handoffs in Support of Mobile Internet Audio", ACM J. Mobile Net. And Appl., v3, No. 4, Dec. 1998, all pages.

Gustafsson Eva et al.: "Mobile IPv4 Regional Registration", draft-ietf-mobileip-reg-tunnel-09.txt, Mobile IP Working Group Internet Draft, Jun. 25, 2004, all pages.

Ericsson, "low Latency Handoffs in Mobile IPv4", Network Working Group, Internet-Draft, Expires Dec. 2004, Jun. 2004, draft-ietf-mobileip-lowlatency-handoffs-v4-09.txt, all pages.

Soliman, Hesham et al.: Hierarchical Mobile IPv6 Mobility management (HMIPv6), draft-ietf-mipshop-hmipv6-03.txt, Network Working Group, Expires: Apr. 2005, Oct. 2004, all pages.

Kempf, James et al.: "Post-handover Mobile Initiated Tunneling for Fast Mobile IPv4 Handover", draft-kempf-mobileip-postmit-handover-00.txt, Expires: Jun. 2002, all pages.

Fathi, Hanane et al.: "Mobility Management for VoIP in 3G Systems: Evaluation of Low-Latency Handoff Schemes", IEEE Wireless Communications, Apr. 2005, 1536-1284/05, pp. 96-104.

Perkins, C: "IP Mobility Support", Network Working Group, Request for Comments: 2002 IBM, Oct. 1996, all pages.

Translation of the Official Communication from the German Patent and Trademark Office date Aug. 19, 2011, all pages.

* cited by examiner

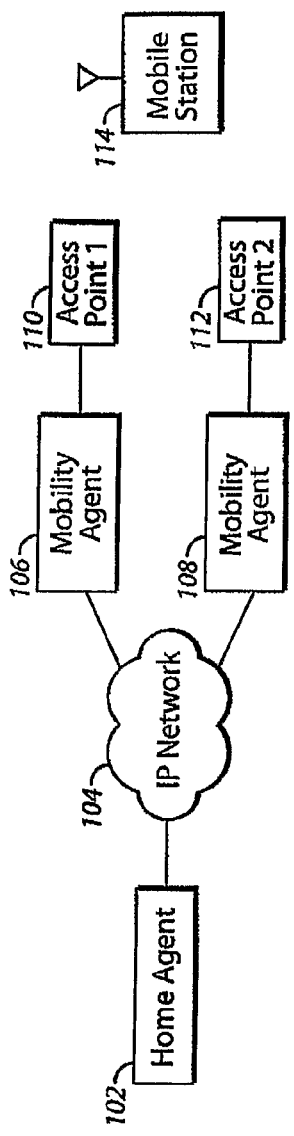
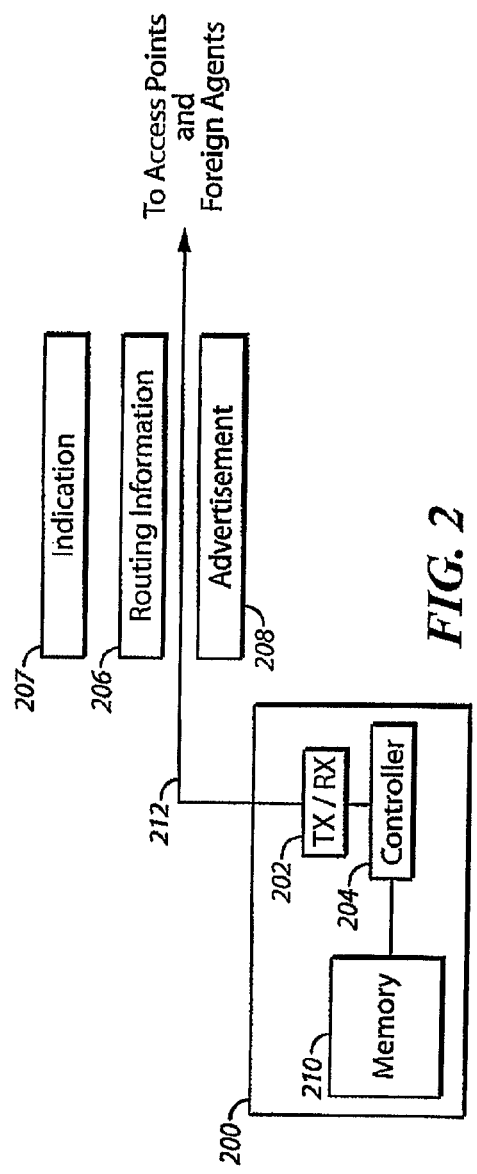

SYSTEM AND METHOD FOR PROVIDING A DISTRIBUTED VIRTUAL MOBILITY AGENT

RELATED APPLICATIONS

This application relates to the following patent applications as were filed on even date herewith (wherein the contents of such patent applications are incorporated herein by this reference):

METHOD AND APPARATUS TO FACILITATE COMMUNICATIONS USING SURROGATE AND CARE-OF INTERNET PROTOCOL ADDRESSES Ser. No. 11/913,939;

ADDRESS RESOLUTION PROTOCOL-BASED WIRELESS ACCESS POINT METHOD AND APPARATUS Ser. No. 11/913,940;

METHOD AND APPARATUS TO FACILITATE MOBILE STATION COMMUNICATIONS USING INTERNET PROTOCOL-BASED COMMUNICATIONS Ser. No. 11/913,944;

METHOD AND APPARATUS FOR REDUCING LATENCY DURING WIRELESS CONNECTIVITY CHANGES Ser. No. 11/913,936;

SYSTEM AND METHOD FOR PAGING AND LOCATION UPDATE INA NETWORK Ser. No. 11/913,942; and METHOD, APPARATUS, AND SYSTEM FOR ESTABLISHING A DIRECT ROUTE BETWEEN AGENTS OF A SENDER NODE AND A RECEIVER NODE Ser. No. 11/913,935.

FIELD OF THE INVENTION

The field of the invention relates to routing communications through networks and, more specifically, to routing communications to mobility agents within these networks.

BACKGROUND OF THE INVENTION

The Mobile Internet Protocol (MIP) represents a network-level approach for supporting the mobility of mobile stations across various networks and/or sub-networks. When a mobile station moves from its home network to operate in a foreign network, a home agent associated with the mobile station tunnels data packets destined for the mobile station to a Care-of-Address (CoA) associated with the mobile station. The CoA may be associated with a mobility agent (e.g., a foreign agent). Data packets destined for the mobile station can then be tunneled to the mobility agent and, subsequently, to the mobile station.

In previous systems, mobility agents sent advertisements to advertise their presence to mobile stations. When the mobile station detected a change in a mobility agent through the receipt of the advertisement, the mobile station sent a MIP registration request through the new mobility agent to the home agent. In other words, the mobile station was required to conduct a MIP registration each time it changed mobility agents.

While providing for mobility agent changes, these previous approaches had several problems, which were particularly acute when the mobile station's connection to the network was a wireless connection. For instance, multiple MIP registrations wasted valuable system resources that could be used for other purposes. Consequently, handover latency became poor in many of these previous systems. In addition, the multiple registrations that occurred increased the possibility of losing messages. Message loss became particularly acute if the wireless connection deteriorated immediately before or after a handover occurred, further degrading system performance.

Other approaches, such as using proxy mobility agents, were devised in the context of providing MIP-like service to mobile stations that were not themselves capable of providing MIP functionality. However, these approaches did not alleviate the problems described above for mobile that were inherently capable of providing MIP functionality. As such, these later approaches were still vulnerable to packet loss where the Radio Frequency (RF) conditions before and after the handover were poor.

BRIEF DESCRIPTION OF THE DRAWINGS

FIG. 1 is a block diagram of a system for providing a decentralized, virtual mobility agent according to the present invention;

FIG. 2 is a block diagram of a mobility agent according to the present invention.

Figure 3:
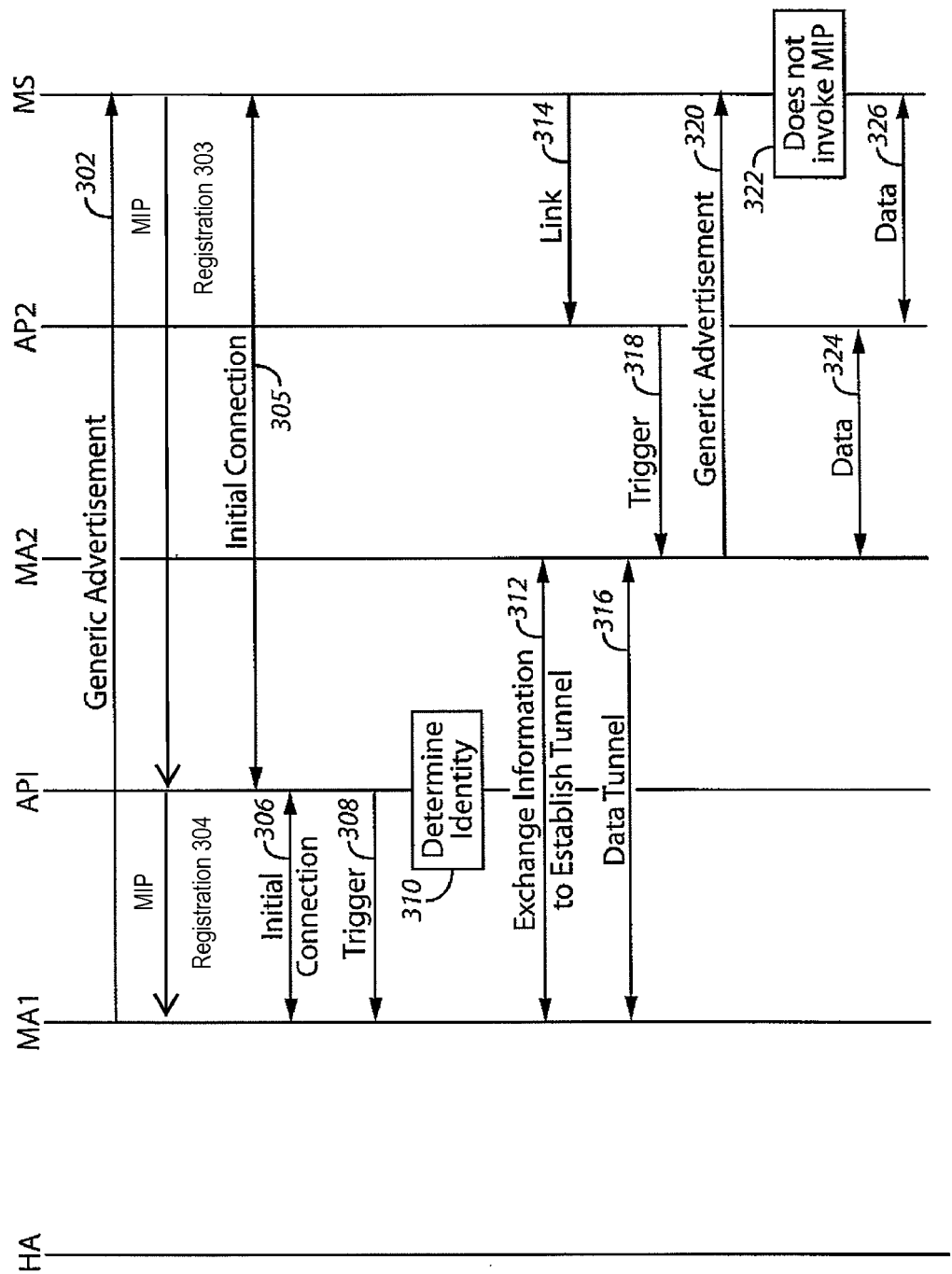
FIG. 3 is a call flow diagram of a system that uses a virtual mobility agent according to the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method is provided that allows multiple mobility agents to share information and supply generic advertisements to mobile stations such that the mobile stations do not invoke Mobile Internet Protocol (MIP)-compliant registration procedures as these stations move between the domains of mobility agents. Consequently, system resource usage is conserved, system efficiency is enhanced, and handover latency is improved. In addition, the approaches described herein are applicable to mobile stations that implement MIP-compliant protocols and do not require any MIP-specific enhancements at the mobile station. From the point of view of the mobile station, the multiple mobility agents are effectively formed into a single, distributed virtual mobility agent to which the mobile station always believes it is assigned, regardless of the actual, physical mobility agent to which it actually communicates.

In many of these embodiments an indication of a change in the connectivity of a mobile station indicating that the mobile station is moving from the domain of an originating mobility agent to the domain of a destination mobility agent is received. The agent change message may be a Layer 2 (L2) trigger message. An identity of the destination mobility agent is determined using the indication. The identity of the destination mobility agent may be determined by using an address of an access point contained in the indication. Routing information is sent from the originating mobility agent to the destination mobility agent using the identity. The routing information may include an address of a network element, such as a home agent and an address associated with the mobile station. Incoming data is routed to the mobile station using the routing information.

Routing information is sent from the originating mobility agent to the destination mobility agent using the identity. The routing information may include a home address of the mobile station and the address of a network element such as a home agent. Incoming data is routed to the mobile station using the routing information, for example, by effecting a redirection of data destined for the mobile station from the network element to the destination mobility agent. Alternatively or in addition, data destined for the mobile station may be forwarded from the originating mobility agent to the destination mobility agent.

In others of these embodiments, the indication may be received at the destination access point and destination mobility agent. The destination mobility agent then may determine the identity of the originating mobility agent and/or access point. Consequently, the destination mobility agent and originating mobility agent may exchange information and the destination mobility agent may send a generic advertisement to the mobile.

In many of these embodiments, a generic agent advertisement is sent to the mobile station. After receiving the advertisement, the mobile station will not attempt a MIP-compliant registration with the destination mobility agent when moving from the originating mobility agent to the destination mobility agent. In one approach, the advertisement remains substantially the same over time. However, the generic advertisement may be changed as long as the mobile station is associated with the same mobility agent, but then remain substantially the same when the mobile station changes mobility agents.

Data may be routed to the mobile station in a number of ways. For instance, the data may be directly routed from the originating mobility agent to the destination mobility agent. In another example, the incoming data may be routed from a home agent of the mobile station to the destination mobility agent.

Thus, approaches are described that conserve system resources and avoid MIP registration each time a mobile station transitions between mobility agents. The approaches are simple to implement and do not require any enhancements to be made at the mobile station. The multiple mobility agents effectively form a virtual mobility agent to which the mobile station always believes it is assigned, regardless of the actual, physical mobility agent to which it communicates.

Referring now to FIG. 1, one example of a system that provides a virtual mobility agent is described. A home agent 102 of a mobile station 114 is coupled to the mobile station 114 by an Internet Protocol (IP)-compliant network 104, mobility agents 106 and 108, and access points 110 and 112.

The home agent 102 is associated with the home network of the mobile station 114. The mobile station 114 may be any type of mobile wireless device such as a cellular phone, pager, personal digital assistant (PDA), or laptop computer. Other examples of mobile stations are possible. The network 104 may be any type of network or combination of networks that support IP or other IP-like protocols, such as, but not limited to, IPv4 or IPv6-based communications.

The mobility agents 106 and 108 are associated with mobility networks when the mobile moves from its home network and may be enhanced forms of foreign agents. The access points 110 and 112 are any type of network device that allow a mobile station to communicate with a mobility agent. In this regard, the access points 110 and 112 may be base stations and/or include base station functionality so that they may receive Radio Frequency (RF) signals from the mobile station 114 and pass these signals to the appropriate mobility agent.

The identity of the destination mobility agent 108 associated with the destination access point 112 needs to be determined so that the originating mobility agent 106 can exchange information, such as routing information relating to the mobile with the destination mobility agent 108. The identity of the destination mobility agent 108 is determined by the mobility agent 106 using information contained in the indication of the change in the wireless connectivity of the mobile station 114. In one example, the identity of the originating mobility agent may be determined by using an address of the destination access point 112 that is provided in the indication.

A generic agent advertisement may be sent to the mobile station 114 by the mobility agent 108. In some examples, the generic agent advertisement advertises some attributes, such as a care-of address or a subnet prefix, that are not inherently associated with the mobility agent 108. In other examples, the generic agent advertisement sent to the mobile station 114 may differ in at least one attribute from a generic agent advertisement sent by the mobility agent 108 to at least one other mobile station. In still other examples, the generic agent advertisement may be sent after the mobile has completed a change of connectivity from the domain of the mobility agent 106 to the domain of the mobility agent 108. In some other examples, the agent advertisement sent to the mobile station by mobility agent 108 is substantially the same as the agent advertisement sent previously to the mobile station by mobility agent 106. In many of these examples, after receiving the advertisement, the mobile station 114 does not attempt a MIP registration with the destination mobility agent 108 after moving from the originating mobility agent 106 to the destination mobility agent 108. No action is taken because the generic advertisement makes the mobile station 114 believe that it is still communicating with the same mobility agent as before.

In one approach, the advertisement remains substantially the same over time. However, the generic advertisement may be changed as long as the mobile station is associated with the same mobility agent, but then remain substantially the same when the mobile station changes mobility agents.

In another example of the operation of FIG. 1, the mobile station 114 may move to the destination access point 112 associated with the destination mobility agent 108. The detection of the change in connectivity status of the mobile station 114 is performed by the destination access point 112 and destination mobility agent 108. In this case, the destination mobility agent 108 contacts the originating mobility agent 106 and agent advertisement information is exchanged. The destination mobility agent 108 may then send a generic advertisement to the mobile station 114. In some cases, the originating mobility agent 106 and destination mobility agent 108 may exchange routing information relating to the mobile, using which the destination mobility agent can then effect a redirection of data from the home agent 102. Alternatively or in addition, the originating mobility agent 106 may forward data destined to the mobile to the destination mobility agent 108.

Referring now to FIG. 2, one example of a mobility agent 200 is described. The mobility agent 200 includes a transmitter/receiver 202, a controller 204, and a memory 210. The transmitter/receiver 202 is coupled to access points and other mobility agents by a communication channel 212.

In one example of the operation of the mobility agent of FIG. 2, the controller 204 is programmed to send a generic agent advertisement 208 to a mobile station at the output of the transmitter/receiver 202. In another example of the operation of the mobility agent of FIG. 2, the mobility agent 200 acts as a destination mobility agent. In this case, the controller 204 is programmed to receive routing information 206 from an originating mobility agent at the input of the transmitter/receiver 202 and to send a generic agent advertisement 208 to a mobile station at the output of the transmitter/receiver 202. In some examples, the mobile station, upon receiving the advertisement 208, will not attempt to conduct a MIP registration. The controller 204 may be further programmed to effect a redirection of data from a network element such as a home agent to the mobile station.

In another example, the mobility agent 200 may act as the originating mobility agent. In this case, the controller 204 is programmed to receive an indication 207 of a change of wireless connectivity of a mobile station at the input of the transmitter/receiver 200 and to responsively determine an identity of a destination mobility agent using the indication 207. The indication 207 may include an address of a destination access point, in one example. The controller 204 is further programmed to send the information 206 to the destination mobility agent at the output of the transmitter/receiver 202 using this identity. The information 206 may include information related to the generic agent advertisement previously sent by the originating mobility agent 200 to the mobile station. The data may be directly routed to the destination mobility agent using the information 206 or redirected from a home agent of the mobile station to the destination mobility agent.

Referring now to FIG. 3, one example of an approach for providing a distributed virtual mobility agent is described. In the example of FIG. 3, a mobile station (MS) that is operating at a first access point (AP1) associated with a first mobility agent (MA1) moves to a second access point (AP2) that is associated with a second mobility agent (MA2). When the mobile station (MS) initially registers with the first mobility agent (MA1), the first mobility agent (MA1) initially sends a generic agent advertisement 302. The advertisement sent to the mobile station (MS) at step 302 does not identify the advertisement as being specific to the first mobility agent (MA1). Instead, the advertisement is identified as being from a generic (virtual) mobility agent. In response, the mobile station (MS) may at steps 303 and 304 send a MIP registration to the first mobility agent (MA1). In some cases, the mobile station (MA) may not perform the MIP registration of step 303 and 304, depending on the structure of the generic agent advertisement 302.

At steps 305 and 306, a data path is established between the mobile station (MS), the first access point (AP1), and the first mobility agent (MA1). The data path continues from the first mobility agent (MA1) to a home agent of the mobile station (MS). The data path between the first mobility agent (MA1) and the home agent may be set up based on some parameters sent in the generic advertisement 302. At step 308, a trigger is sent from the first access point (AP1) to the first mobility agent (MA1). The trigger may be a Layer 2 (L2) trigger that indicates that the access point has detected that a handover (of the mobile station (MS) to another access point) is imminent. The trigger may include the identity of the new access point.

At step 310, the first access point (AP1) determines the identity of the second mobility agent (MA2) based, at least in part, upon the identity of the second access point (AP2). In one example, this may be accomplished by using Domain Name Server (DNS) lookup.

At step 312, the first mobility agent (MA1) and the second mobility agent (MA2) exchange information pertaining to the generic agent advertisement 302 sent previously to the mobile station. In addition, the first mobility agent (MA 1) and the second mobility agent (MA2) may exchange other information related to the mobile station (MS), such as the home address, a network element address such as a home agent address, and any additional security context information associated with the mobile station (MS). The second mobility agent (MA2) may effect a redirection of data destined for the mobile station (MS) from a network element such as a home agent in step 316.

At step 314, the mobile station (MS) establishes a link to the second access point (AP2) at the completion of the handover. At step 318, the second access point (AP2) sends a trigger to the second mobility agent (MA2) indicating that the link has been established. On the receipt of the trigger, at step 320, the second mobility agent (MA2) sends an agent advertisement that is substantially identical to the advertisement sent at step 302. In this way, the mobile station (MS) will believe that it is still connected with the same (virtual) mobility agent it was connected with earlier, and will not issue a MIP registration request to the second mobility agent (MA2). The advertisement sent at step 320 does not identify the advertisement as being specific to the second mobility agent (MA2) but, instead, identifies a generic (virtual) mobility agent. Consequently, at step 322, the mobile station (MS) does not invoke any MIP registration procedures. At steps 324 and 326, data is sent from the second mobility agent (MA2) to the second access point (AP2) and from the second access point (AP2) to the mobile station (MS).

Thus, approaches are described herein that conserve system resources and avoid MIP registration each time a mobile station transitions between mobility agents. The approaches are simple to implement and do not require any enhancements at the mobile station. The multiple mobility agents effectively form a virtual mobility agent to which the mobile station always believes it is assigned regardless of the actual, physical mobility agent to which it communicates.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method for handling the connectivity for a mobile station comprising:

forming a generic agent advertisement at a mobility agent, wherein the generic agent advertisement is identical to a previous agent advertisement sent to the mobile station by another mobility agent, the generic agent advertisement comprising at least one attribute not associated with the mobility agent; and sending the generic agent advertisement to a mobile station.

2. The method of claim 1, wherein forming the generic agent advertisement comprises forming a generic agent advertisement having a care-of-address that is not associated with the mobility agent.

3. The method of claim 1, wherein forming a generic agent advertisement comprises forming a generic agent advertisement using a subnet prefix that is not associated with the mobility agent in the generic agent advertisement.

4. The method of claim 1, wherein sending a generic agent advertisement to a mobile station comprises sending an advertisement to the mobile station that is different than a previous advertisement sent to a different mobile station by the mobility agent.

5. The method of claim 1, wherein sending the agent advertisement to the mobile station comprises sending the advertisement following a change in wireless connectivity of the mobile station and wherein the method further comprises one or more of exchanging information related to an agent advertisement previously sent to the mobile station by an originating agent, exchanging information related to at least one of a home address of the mobile station and an address of a network element and effecting a redirection of data destined for the mobile station from a network element to a destination mobility agent, and forwarding data destined for the mobile station from the originating mobility agent to the destination mobility agent.

6. A method of sending an advertisement to a mobile station comprising:
    detecting a change in connectivity of the mobile station, wherein the change in connectivity comprises a transition of mobility agents;
    determining an identity of a mobility agent using the change; and
    sending a generic agent advertisement to the mobile station, wherein the generic agent advertisement does not invoke a Mobile internet protocol (MIP) registration procedure at the mobile station.

7. The method of claim 6 wherein determining the identity comprises determining the identity of a mobility agent by using an address of an access point contained in a connectivity change message.

8. The method of claim 6 wherein detecting a change comprises receiving a Layer 2 (L2) trigger message.

9. A mobility agent comprising:
    a receiver having an input;
    a transmitter having an output;
    a memory for storing a generic agent advertisement;
    a controller coupled to the receiver, the transmitter, and the memory, the controller programmed to form a generic agent advertisement comprising at least one attribute not associated with the mobility agent at the output of the transmitter, wherein the generic agent advertisement is identical to a previous agent advertisement sent to a mobile station by another mobility agent and the controller is further programmed to send the generic agent advertisement to a mobile station.

10. The mobility agent of claim 9 wherein the controller is further programmed to receive an indication of a change in wireless connectivity of the mobile station at the input of the receiver and to responsively determine an identity of the another mobility agent based upon the indication.

11. The mobility agent of claim 10 wherein the controller is further programmed to exchange agent advertisement information with the another mobility agent at the output of the transmitter using the identity.

12. The mobility agent of claim 9 wherein the controller is further programmed to exchange routing information related to the mobile station with the another mobility agent and to effect a redirection of data destined to the mobile station from a network element.

13. A system for sending generic agent advertisements to a mobile station comprising:
    a first mobility agent in communication with an access point, the first mobility agent including:
        a first receiver having an input;
        a first transmitter having an output;
        a first memory for storing a generic agent advertisement;
        a first controller coupled to the first receiver, the first transmitter, and the first memory, the first controller programmed to detect a change in connectivity of the mobile station and to determine an identity of a second mobility agent using the change, wherein the change in connectivity comprises a transition of mobility agents; and
    the second mobility agent including:
        a second receiver having an input;
        a second transmitter having an output;
        a second memory for storing another generic agent advertisement;
        a second controller coupled to the second receiver, the second transmitter, and the second memory, the second controller programmed to send the another generic agent advertisement to the mobile station wherein the another generic agent advertisement does not invoke a Mobile internet protocol (MIP) registration procedure at the mobile station.

* * * * *